United States Patent
Leonard et al.

[11] 3,930,471
[45] Jan. 6, 1976

[54] INTERNAL COMBUSTION ENGINE

[75] Inventors: Henry J. Leonard; Boris J. Mitchell, both of Birmingham; Charles H. Turner, Pleasant Ridge, all of Mich.

[73] Assignee: General Motors Corporation, Detroit, Mich.

[22] Filed: Jan. 17, 1974

[21] Appl. No.: 434,060

[52] U.S. Cl. ...... 123/32 SP; 123/75 B; 123/188 AF; 123/90.4; 123/32 SA; 123/32 ST; 123/191 SP
[51] Int. Cl.² .................. F02B 19/10; F02B 19/16
[58] Field of Search .......... 123/75 B, 32 SP, 32 SA, 123/32 ST, 191 S, 122 H, 143 B, 32 SJ, 90.4, 90.22, 188 AF, 191 SP

[56] References Cited
UNITED STATES PATENTS

| | | | |
|---|---|---|---|
| 1,438,937 | 12/1922 | Arnold | 123/90.4 |
| 1,568,638 | 1/1926 | Summers | 123/32 SP |
| 1,647,849 | 11/1927 | Woolson | 123/90.22 |
| 2,930,367 | 3/1960 | Kolbe | 123/122 H |
| 3,092,088 | 6/1963 | Goossak | 123/75 B |
| 3,213,839 | 10/1965 | Gitlin | 123/75 B |
| 3,853,097 | 12/1974 | Kume | 123/32 SP |

Primary Examiner—Charles J. Myhre
Assistant Examiner—Ronald B. Cox
Attorney, Agent, or Firm—Robert J. Outland

[57] ABSTRACT

A torch ignition engine of reduced complexity and including novel arrangements of the cylinder heads and manifolds. Specific features of a preferred embodiment include auxiliary ignition chambers formed by cup shaped inserts retained in place by the spark plugs, auxiliary intake valves actuated directly by tappets mounted on the spring seats of the main intake valves, and auxiliary induction passages extending internally of the intake manifold, cylinder heads and exhaust manifolds where they extend in heat exchange relation with various exhaust gas passages.

7 Claims, 4 Drawing Figures

INTERNAL COMBUSTION ENGINE

FIELD OF THE INVENTION

This invention relates to internal combustion engines and, more particularly, to spark ignition engines of the type having separate ignition chambers adjacent the main combustion chambers and supplied with separate fuel mixture charges for ignition and formation of a flame jet or torch to ignite and burn the charge in the main chambers. In its more particular aspects, the invention relates to advantageous arrangements and configurations of related engine components to provide the desired features in a construction of relatively low complexity and adaptable for manufacture in commercial quantities.

BACKGROUND OF THE INVENTION

Internal combustion engines of the so called jet-ignition or torch-ignition type generally provide a small ignition chamber adjacent the main combustion chamber for each cylinder and connected therewith by a small orifice. The main combustion chambers are supplied with air-fuel mixture chosen for economy, emissions reduction, etc. which may not be easily ignitable. The auxiliary chambers are supplied through separate induction means with a small volume of easily ignitable air-fuel mixture which is then ignited by a spark plug. Burning the mixture in the auxiliary chamber causes expansion through the orifice, resulting in a jet or flame extending into the main chamber which causes ignition and burning of the main charge.

While torch ignition engines have been known in the art for many years, they have not achieved wide commercial usage. In previous designs, the complexities caused by dual induction systems, intake valves, valve actuating mechanisms, and exhaust or other mixture heating devices have resulted in relatively complex engine constructions, adding to the cost of manufacture as well as requiring careful attention to manufacturing details to obtain the desired operating characteristics.

SUMMARY OF THE INVENTION

The present invention provides torch or jet-ignition engines having advantageously arranged auxiliary ignition chambers, intake valves, and induction means integrated with modified conventional engine components so as to minimize the complexities and cost inherent in the production of such engines.

The arrangements include provision of auxiliary chambers formed by thin metal cup shaped inserts applied through the spark plug openings and preferably retained in place by insertion of their respective spark plugs. Cylinder heads include provision for auxiliary intake valve openings into each auxiliary chamber, as well as the usual main intake and exhaust valves. The auxiliary intake valves are located adjacent the main intake valves and operated by adjustable tappet arrangements provided on one side of the respective spring seat members attached to the ends of the main intake valves so that both main and auxiliary intake valves are actuated together by the intake valve actuating mechanism.

The intake and exhaust passages are conventionally routed through intake and exhaust manifolds and connecting ports in the engine cylinder heads. Auxiliary intake passages which receive air-fuel mixture from the smaller bore of a multiple throat carburetor are routed through the intake manifold to the cylinder heads and, thence, to the exhaust manifolds from which they extend at each cylinder location into auxiliary inlet passages in the cylinder heads at each cylinder location.

Exhaust heat passages are provided in the intake manifold and cylinder head for directing exhaust gases to heat the main mixture passages, particularly during engine warm up. Additional heat is supplied to the auxiliary mixture passages which extend in heat exchange relation with the exhaust heat passages in the intake manifold and cylinder heads, as well as with certain of the exhaust passages in the cylinder heads and exhaust manifolds.

These and other features and advantages of the present invention will be more clearly understood from the following description of a preferred embodiment of the invention, taken together with the accompanying drawings.

DESCRIPTION OF THE PREFERRED EMBODIMENT

Figure 1:
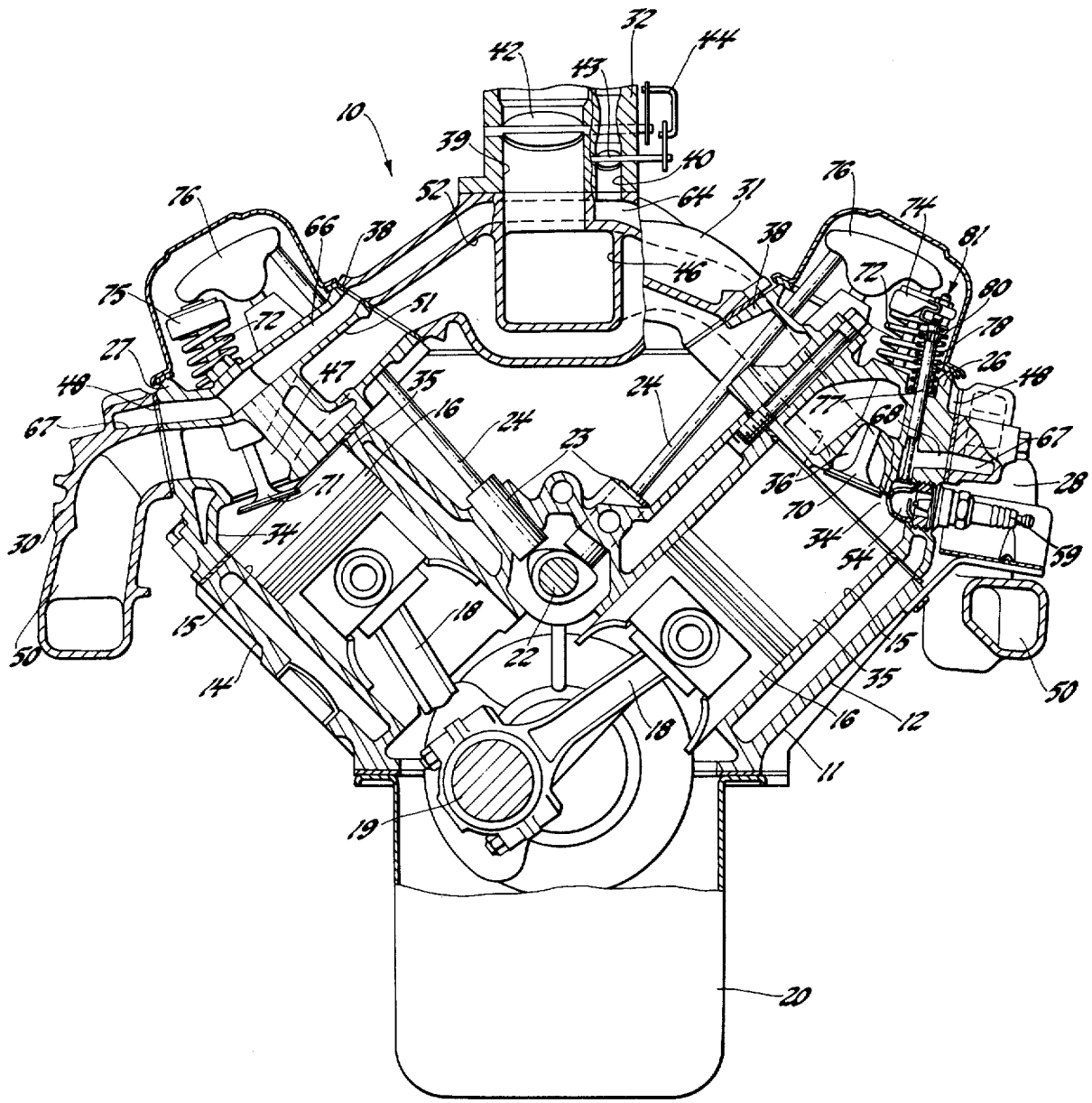
FIG. 1 is a cross sectional view of a "V" type internal combustion engine constructed in accordance with the present invention and showing construction details thereof.
Figure 2:
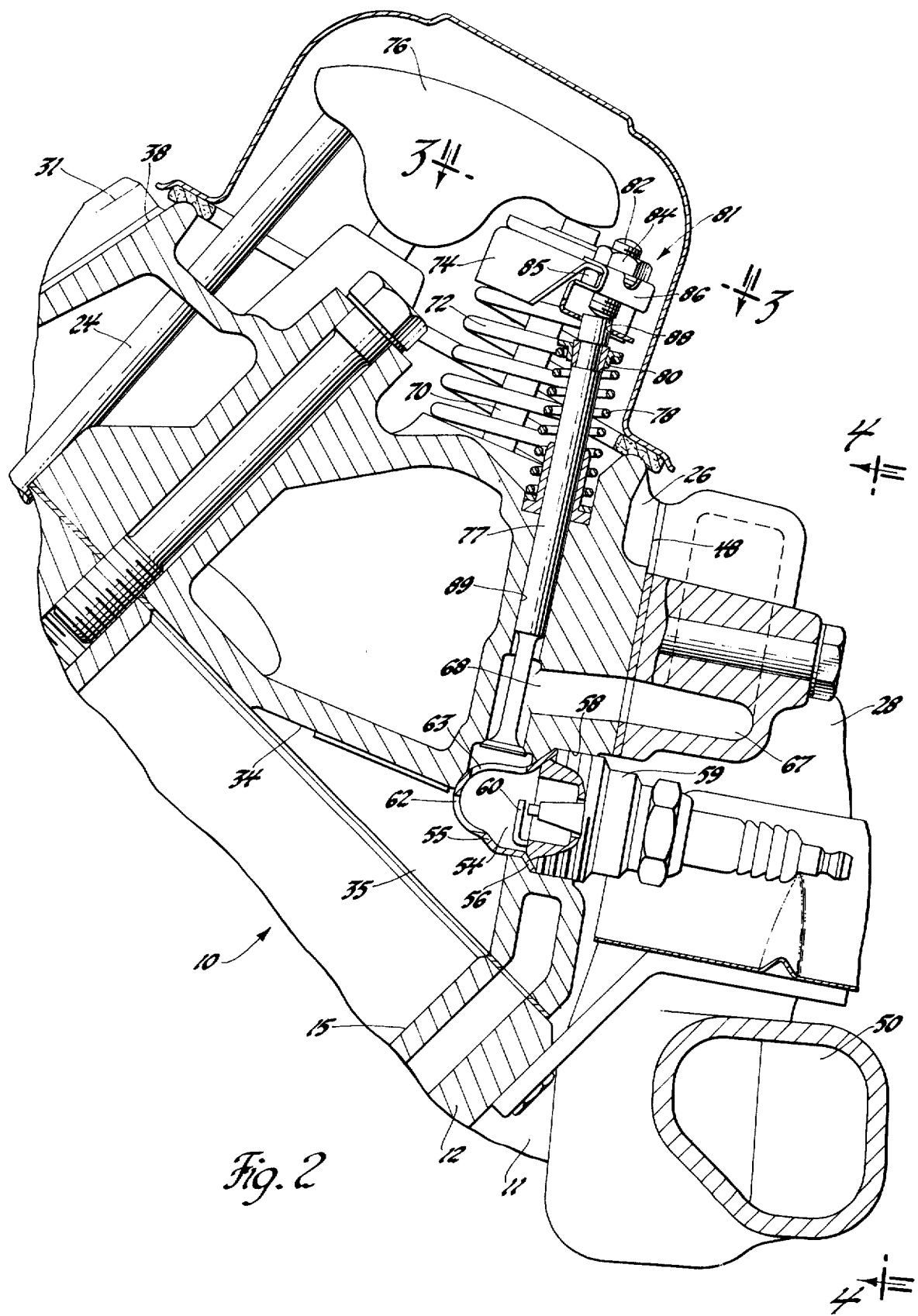
FIG. 2 is an enlarged cross sectional view of a portion of the engine of FIG. 1 showing additional detail with respect to the combustion chambers and valve mechanism.
Figure 3:
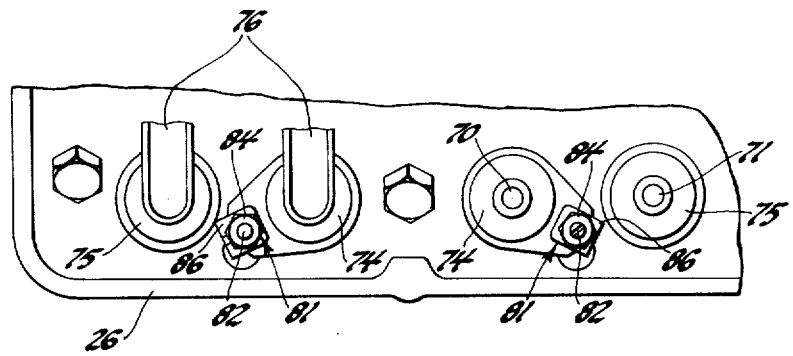
FIG. 3 is a view looking downward on one of the cylinder heads from the plane indicated by the line 3-3 of FIG. 2 and showing certain details of the valve actuating mechanism.
Figure 4:
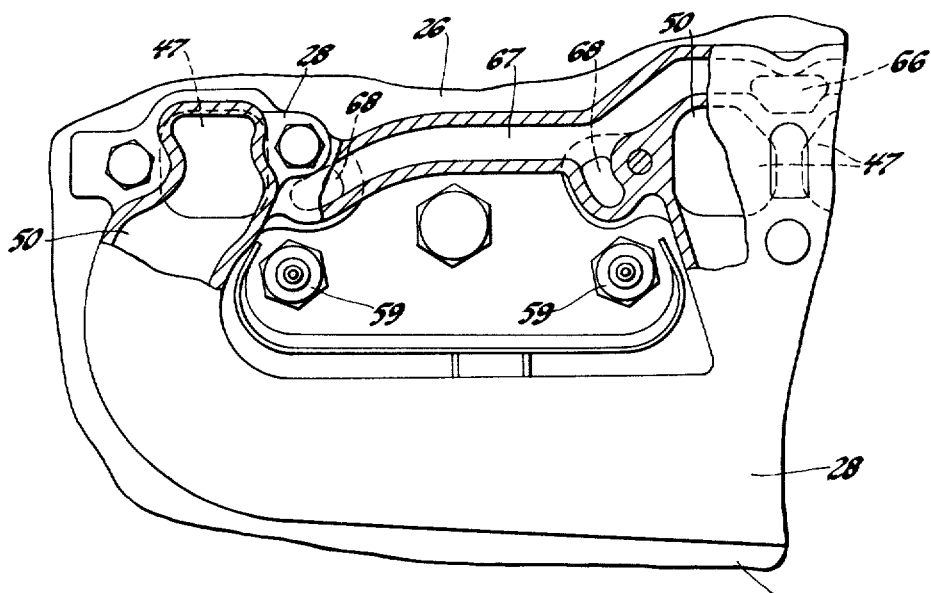
FIG. 4 is a side view of a portion of the exhaust manifold as viewed from the plane indicated by the line 4-4 of FIG. 2, with portions broken away to show the internal construction of the exhaust and auxiliary intake passages.

Referring to the drawings in detail, numeral 10 generally indicates an internal combustion engine according to the present invention and having a conventionally constructed cylinder block 11. Block 11 includes a pair of cylinder banks 12 and 14 arranged in V fashion, and each containing a plurality of cylinders 15 longitudinally aligned in conventional fashion. The cylinders are provided with reciprocating pistons 16 movable therein and respectively connected by means of connecting rods 18 with the crank throws of a crankshaft 19 mounted in the cylinder block and enclosed by the usual oil pan 20. A camshaft 22 driven from the crankshaft by conventional means, not shown, is provided in the center of the block with cams to actuate a plurality of valve lifters 23 that connect through push rods 24 with other portions of the valve mechanism to be subsequently described.

Mounted upon the cylinder block are a pair of cylinder heads 26 and 27, which in turn support exhaust manifolds 28 and 30, an intake manifold 31 and a carburetor 32. Each of these components includes modifications in accordance with the present invention to provide the novel features of the torch ignition engine arrangement herein described.

The cylinder heads 26, 27 are mounted on the ends of the cylinder banks 12, 14, respectively, closing the ends of the cylinders in their respective banks. At each cylinder location the cylinder heads include a wedge shaped recess 34 which cooperates with its respective cylinder and piston to define and enclose an expansible working and combustion chamber 35. When the pistons are at their respective top dead center positions, the majority of the clearance volume is located within the wedge shaped recesses 34 which then comprise the main combustion chambers 35.

Each cylinder head includes intake ports 36 extending from each combustion chamber recess 34 through an inner side wall 38 of the cylinder head. The intake manifold 31 is mounted on these inner side walls 38 and, in turn, supports the carburetor 32. The carburetor is provided with separate main and auxiliary throats 39 and 40, each having their own throttle valves 42, 43, preferably connected by suitable linkage 44. Main intake passages extend from the main carburetor throat 39 through passages 46 in the intake manifold and the respective intake ports 36 of the cylinder heads to the main combustion chambers 35 of each cylinder.

Cylinder heads 26, 27 each include an exhaust port 47 for each cylinder location which extends from its respective combustion chamber recess 34 through an outer side wall 48 of its cylinder head. Wall 48 is located generally opposite to the inner side wall 38 on which the intake manifold is mounted. Exhaust manifolds 28, 30 are mounted on the outer side walls 48 in conventional fashion for a V type engine. The exhaust manifolds define exhaust gas passages 50, which connect with the various exhaust ports of the cylinder heads to which the manifolds are attached to form exhaust passages leading from the respective combustion chambers 35 to atmosphere.

Toward the longitudinal center of the engine, the cylinder heads are provided with inwardly extending exhaust heat ports 51 connecting with the central exhaust ports 47 and extending through the inner side walls 38 of the respective cylinder heads. Ports 51 connect with a crossover passage 52 in the intake manifold which passes in heat exchange relation with the central or plenum portion of the intake passages 46 in the intake manifold. Passages 51, 52 thus cooperate to define exhaust heat passages which provide a path for exhaust gases to heat the intake mixture, particularly during engine warm up, although some heat may be supplied under all conditions of operation. Conventional means (not shown) such as a manifold heat valve may be used in the exhaust system to control the flow of exhaust gas in the crossover passage and thus the amount of heat supplied to the mixture thereby.

In the upper corner of the wedge shaped recess of each engine combustion chamber there is provided a small ignition chamber 54, preferably formed by a thin wall cup shaped insert member 55. The insert 55 preferably has a flanged portion 56 and is installed through a threaded opening 58 in the outer wall 48 of the respective cylinder heads. The insert is then retained in place by a spark plug 59 received in the threaded opening 58. Spark plug 59 includes electrodes 60 extending within the ignition chamber 54. The cup insert 55 has a restricted orifice 62 connecting the ignition chamber with its respective main combustion chamber 35. An opening 63 is also provided in the wall of the insert member to permit the induction of a separately supplied air-fuel mixture into the ignition chamber.

Supply of ignitable air-fuel mixtures to the auxiliary ignition chambers is provided for by means of auxiliary intake passages which comprise a laterally extending passage 64 in the intake manifold 31 which connects with the small throat 40 of the carburetor, transversely extending passages 66 in the cylinder heads 26, 27, generally longitudinally extending passages 67 in the exhaust manifolds, and auxiliary intake port means 68 formed preferably by drilled passages in the cylinder head and connecting with the opening 63 in the ignition chamber wall. Passage 64 in the intake manifold extends in heat exchange relation with the crossover passage 52 in order to provide for heating of the intake mixture. Additional heating is provided for by the location of the passages 66 in the cylinder heads in heat exchange relation with the inwardly extending exhaust heat passages 51 as well as with the central exhaust ports 47. Additionally, the passages 67 in the exhaust manifolds extend at their inner ends in heat exchange relation with the exhaust passages 50 of the exhaust manifolds. Accordingly, exhaust heat is applied to the air-fuel mixture supplied to the auxiliary chambers under all engine operating conditions, the amount of heat being controllable by the control of exhaust gas flow through the manifold crossover passages, but being supplemented by passage of the auxiliary intake passages in heat exchange relation with the exhaust ports and exhaust manifold passages.

The main inlet and exhaust ports of each combustion chamber are controlled in conventional fashion by inlet and exhaust poppet valves 70, 71, respectively. These valves are seated conventionally by coil springs 72 which bear against cup shaped seat members 74, 75, respectively. Rocker arms 76 are provided which are engaged by the push rods 24 to actuate the valves in their opening directions during predetermined portions of the engine cycle, as determined by operation of the camshaft 22.

The auxiliary intake ports 68 are controlled at each cylinder by an auxiliary intake poppet valve 77 which is reciprocably mounted in the cylinder head and is seated by a coil spring 78 bearing upon a seat member 80 retained on the end of the valve stem. The auxiliary poppet valves are opened by tappet means 81 provided on the edges of the spring seat cup 74 of the inlet valves. Tappets 81 include threaded actuators 82 extending through openings in their respective seat members 74 and retained in position by pairs of lock nuts 84, 85. S shaped sheet metal guide members 86 are also retained in position on the spring seats 74 by the nuts 84, 85 and extend downwardly below the threaded actuators 82 to straddle the ends of the stems of their respective auxiliary intake valves 77 with bifurcated portions 88. The guide members 86, in straddling the valves 77, prevent rotation of the spring seats 74 and thus maintain the tappets 81 in position, engaging the ends of the valves 77. Proper clearance for the valve actuating mechanism is obtained by adjustment of the nuts 84, 85 to preset the actuating members 82 to the desired positions.

The arrangement of the wedge shaped combustion chamber recesses 34 in the cylinder heads 26, 27 and their relation with the positions of the auxiliary intake valves 77 permit these valves to be installed in the bores 89 in which they are reciprocably carried in the cylinder heads by insertion of the valves through the combustion chambers in conventional fashion. This, of course, must be accomplished before installation of the cup shaped insert members 55 that define the ignition chambers, since the installation of these insert members walls off portions of the combustion chambers adjacent the auxiliary intake valves.

Alternatively, if desired, removable valve seat and guide assemblies could be provided for the auxiliary intake valves and could be assembled into the heads from the upper surfaces thereof. In such a case, the size of the openings in the recesses 34 between the main combustion chambers 35 and the auxiliary ignition chambers 54 could be reduced to about the size of the orifices 62, since insertion of the auxiliary intake valves 77 through these openings would not be required.

It should be apparent that numerous additional variations might be made in the form and construction of the auxiliary induction passages, and in other features of the invention without departing from the inventive concepts disclosed herein. Accordingly, the invention is intended to be limited only by the language of the following claims.

What is claimed is:

1. An internal combustion engine of the type having a cylinder block with a bank of cylinders spaced longitudinally of the engine, a cylinder head mounted on said block and closing the ends of said cylinders, pistons reciprocably disposed in said cylinders and connected with a rotatable crank, the cylinders, pistons and head together defining enclosed expansible working and combustion chambers, a plurality of intake ports in said cylinder head connecting with each of said combustion chambers and with an intake manifold mounted on one side of said head, a plurality of exhaust ports in said cylinder head connecting with each of said combustion chambers and with an exhaust manifold mounted on a side of said cylinder head opposite from said one side, spark plug receiving means opening to said combustion chambers through said opposite side adjacent said exhaust manifold, spark plugs in said plug receiving openings and having inwardly protruding electrodes, wall means in said combustion chambers and defining small ignition chambers on one side of and connecting with each combustion chamber, said wall means enclosing the spark plug electrodes of their respective combustion chambers, main intake passages extending through said intake manifold and cylinder head intake ports to said combustion chambers, exhaust passages extending from said combustion chambers through said exhaust ports and said exhaust manifold, auxiliary intake passages joined to and extending along said intake manifold, through said cylinder head, along said exhaust manifold and back into said cylinder head to said ignition chambers, said auxiliary intake passages extending in heat exchange relation with one of said cylinder head exhaust ports and exhaust passages in said exhaust manifold, carburetor means on said intake manifold and having separate individually throttled throats connecting with said main and auxiliary intake passages, respectively, and engine driven valve mechanism including a main intake valve, an auxiliary intake valve and an exhaust valve for each combustion chamber, said valves respectively controlling the admission of air-fuel mixtures to the combustion and ignition chambers from the main and auxiliary intake passages and the exhaust of burned gases from the combustion chamber through the exhaust passages.

2. An internal combustion engine of the type having a cylinder block with a bank of cylinders spaced longitudinally of the engine, a cylinder head mounted on said block and closing the ends of said cylinders, pistons reciprocably disposed in said cylinders and connected with a rotatable crank, the cylinders, pistons and head together defining enclosed expansible working and combustion chambers, a plurality of intake ports in said cylinder head connecting with each of said combustion chambers and with an intake manifold mounted on one side of said head, a plurality of exhaust ports in said cylinder head connecting with each of said combustion chambers and with an exhaust manifold mounted on a side of said cylinder head opposite from said one side, spark plug receiving means opening to said combustion chambers through said opposite side adjacent said exhaust manifold, spark plugs in said plug receiving openings and having inwardly protruding electrodes, wall means in said combustion chambers and defining small ignition chambes on one side of and connecting with each combustion chamber, said wall means enclosing the spark plug electrodes of their respective combustion chambers, main intake passages extending through said intake manifold and cylinder head intake ports to said combustion chambers, exhaust passages extending from said combustion chambers through said exhaust ports and said exhaust manifold, auxiliary intake passages joined to and extending along said intake manifold, through said cylinder head, along said exhaust manifold and back into said cylinder head to said ignition chambers, said auxiliary intake passages extending in heat exchange relation with one of said cylinder head exhaust ports and exhaust passages in said exhaust manifolds, an exhaust heat passage extending from one of said cylinder head exhaust ports into said intake manifold an in heat exchange relation with portions of said main intake passages in said intake manifold, said auxiliary intake passages also being in heat exchange relation with said exhaust heat passage in said cylinder head and intake manifold, carburetor means on said intake manifold and having separate individually throttled throats connecting with said main and auxiliary intake passages, respectively, and engine driven valve mechanism including a main intake valve, an auxiliary intake valve and an exhaust valve for each combustion chamber, said valves respectively controlling the admission of air-fuel mixtures to the combustion and ignition chambers from the main and auxiliary intake passages and the exhaust of burned gases from the combustion chamer through the exhaust passages.

3. The engine of claim 2 wherein said ignition chamber defining wall means comprise thin-walled metal cups received in said spark plug openings and retained therein by flanged portions thereof engaged by said spark plugs, said cups having openings to connect said ignition chambers with said combustion chambers and said auxiliary intake passages.

4. The engine of claim 2 wherein said valve mechanism further comprises means mechanically engaging the end of each said main intake valve to actuate it in an opening direction, a spring seat member retained adjacent each said main intake valve end, a valve spring between each said seat member and said cylinder head and urging its respective main intake valve in a closing direction, auxiliary actuating means carried on each said spring seat member and operatively engaging the end of the auxiliary intake valve for its respective cylinder to move said auxiliary valve in an opening direction upon opening movement of said main intake valve, said auxiliary actuating means including means straddling the upper end of said auxiliary intake valve to maintain its auxiliary actuating means in alignment with said auxiliary valve upper end, and a valve spring acting between each said auxiliary intake valve and said head and urging its respective valve in a closing direction.

5. An internal combustion engine of the type having a cylinder block including two banks of longitudinally spaced cylinders, a cylinder head mounted on each of said banks and closing the ends of the cylinders therein, said heads having inwardly and outwardly facing side walls, pistons reciprocably disposed in said cylinders and connected with a rotatable crank, the cylinders, pistons and heads together defining enclosed expansible working and combustion chambers, a plurality of intake ports in said cylinder heads connecting with each of said combustion chambers and opening through the inwardly facing side walls of said heads, an intake manifold mounted on said inwardly facing side walls, a plurality of exhaust ports in said cylinder heads connecting with each of said combustion chambers and opening through the outwardly fcing side walls of said heads, an exhaust manifold mounted on said outwardly facing side wall of each head, spark plug receiving means opening to said combustion chambers through said outwardly facing side walls adjacent said exhaust manifolds, spark plugs in said plug receiving openings and having inwardly protruding electrodes, wall means in said combustion chambers and defining small ignition chambers therein connected with said combustion chambers and enclosing the spark plug electrodes thereof, main intake passages extending through said intake manifold and cylinder head intake ports to said combustion chambers, exhaust passages extending from said combustion chambers through said exhaust ports and exhaust manifolds, auxiliary intake passages joined to and extending sequentially along said intake manifold, through said cylinder heads, along said exhaust manifolds and back into said cylinder heads to said ignition chambers, said auxiliary intake passages being in heat exchange relation with one of said cylinder head exhaust ports and exhaust manifold exhaust passages, and engine driven valve mechanism including a main intake valve, an auxiliary intake valve and an exhaust valve for each combustion chamber and respectively controlling the admission of air-fuel mixtures to the combustion and ignition chambers from the main and auxiliary intake passages and the exhaust of burned gases from the combustion chambers through the exhaust passages.

6. An internal combustion engine of the type having a cylinder block including two banks of longitudinally spaced cylinders, a cylinder head mounted on each of said banks and closing the ends of the cylinder therein, said heads having inwardly and outwardly facing side walls pistons reciprocably disposed in said cylinders and connected with a rotatable crank, the cylinders, pistons and heads together defining enclosed expansible working and combustion chambers, a plurality of intake ports in said cylinder heads connecting with each of said combustion chambers and opening through the inwardly facing side walls of said heads, an intake manifold mounted on said inwardly facing side walls, a plurality of exhaust ports in said cylinder heads connecting with each of said combustion chambers and opening through the outwardly facing side walls of said heads, an exhaust manifold mounted on said outwardly facing side wall of each head, spark plug receiving means opening to said combustion chambers through said outwardly facing side walls adjacent said exhaust manifolds, spark plugs in said plug receiving openings and having inwardly protruding electrodes, wall means in said combustion chambers and defining small ignition chambers therein connected with said combustion chambers and enclosing the spark plug electrodes thereof, said ignition chamber defining wall means comprising thin-walled metal cups received in said spark plug openings and retained therein by flanged portions thereof, said cups having openings to connect said ignition chambers with said combustion chambers and with auxiliary intake ports, main intake passages extending through said intake manifold and cylinder head intake ports to said combustion chambers, exhaust passages extending from said combustion chambers through said exhaust ports and exhaust manifold, auxiliary intake passages joined to and extending sequentially along said intake manifold, through said cylinder heads, along said exhaust manifolds and back into said cylinder head auxiliary intake ports to said ignition chambers, said auxiliary intake passages being in heat exchange relation with a plurality of said cylinder head exhaust ports and exhaust manifold exhaust passages, exhaust heat passages in said cylinder heads and said intake manifold and extending between exhaust ports of the separate heads into heat exchange relation with portions of said main intake passages in said intake manifold, said auxiliary intake passages also being in heat exchange relation with said exhaust heat passages in the cylinder heads and intake manifold, and engine driven valve mechanism including a main intake valve, an auxiliary intake valve and an exhaust valve for each combustion chamber and respectively controlling the admission of air-fuel mixtures to the combustion and ignition chambers from the main and auxiliary intake passages and the exhaust of burned gases from the combustion chambers through the exhaust passages, said valve mechanism further comprising means mechanically engaging the end of each said main intake valve to actuate it in an opening direction, a spring seat member retained adjacent each said main intake valve end, a valve spring between each said seat member and said cylinder head and urging its respective main intake valve in a closing direction, auxiliary actuating means carried on each said spring seat member and operatively engaging the end of the auxiliary intake valve for its respective cylinder, to move said auxiliary valve in an opening direction upon opening movement of said main intake valve, said auxiliary actuating means including means straddling the upper end of said auxiliary intake valve to maintain its auxiliary actuating means in alignment with said auxiliary valve upper end, and a valve spring acting between each said auxiliary intake valve and said head and urging its respective valve in a closing direction.

7. The combination of valve means with an internal combustion engine of the type having a main combustion chamber, an ignition chamber adjacent said main chamber and connected therewith, and main and auxiliary intake port means connected with said main and ignition chambers respectively, said valve means comprising:

a main intake poppet valve in said engine and positioned to control communication of said main intake port with said main chamber,
   an auxiliary intake poppet valve adjacent said main valve in said engine and positioned to control communication of said auxiliary intake port with said ignition chamber, first and second spring seat members on said main and auxiliary valves, respectively.

first and second valve springs engaging said first and second seat members respectively and biasing said valves in their closing directions, engine driven actuating means operatively engaging the end of said main intake valve to actuate it in an opening direction during predetermined portions of engine operation, said first spring seat member including and solely supporting auxiliary actuating means on one side thereof and opertively engaging the end of said auxiliary intake valve to move it in an opening direction upon opening movement of said main intake valve, said auxiliary actuating means including guide means straddling the upper end of said auxiliary intake valve to maintain said auxiliary actuating means in alignment with said auxiliary valve end.

* * * * *